United States Patent [19]

Plagge

[11] Patent Number: 4,684,871
[45] Date of Patent: Aug. 4, 1987

[54] POWER SUPPLY CIRCUIT

[75] Inventor: Joseph A. M. Plagge, Drachten, Netherlands

[73] Assignee: U.S. Philips Corporation, New York, N.Y.

[21] Appl. No.: 845,659

[22] Filed: Mar. 28, 1986

[30] Foreign Application Priority Data

Dec. 18, 1985 [NL] Netherlands ............... 8503479

[51] Int. Cl.[4] ............... H02J 7/10; H02M 3/335
[52] U.S. Cl. ............... 320/21; 320/32; 363/19; 30/DIG. 1
[58] Field of Search ............... 320/2, 31, 32, 20, 21, 320/39, 35; 363/19, 56; 30/DIG. 1

[56] References Cited

U.S. PATENT DOCUMENTS

| | | | |
|---|---|---|---|
| 3,531,706 | 9/1970 | Mullersman | 320/35 X |
| 4,187,536 | 2/1980 | Govaert et al. | 320/2 |
| 4,376,263 | 3/1983 | Pittroff et al. | 320/32 |
| 4,504,775 | 3/1985 | Becker | 363/19 X |

Primary Examiner—R. J. Hickey
Attorney, Agent, or Firm—Robert T. Mayer; Bernard Franzblau

[57] ABSTRACT

A self-oscillating power supply circuit for charging a battery in which energy is stored in a transformer (Tr) during the so-called forward intervals. This energy is applied as a charge current to the battery (6) during the flyback intervals. To prevent overcharge of the battery, the circuit includes a battery voltage protection circuit (10) receiving its power supply from the battery. A fraction of the battery voltage is applied to this circuit by means of a voltage divider ($R_3$, $R_4$) connected across the battery by means of a switch ($S_1$) during the flyback intervals. To prevent the voltage drop across the internal resistance of the battery from influencing the measurement of the battery voltage, the battery voltage is measured after the end of a flyback interval and before the commencment of the next forward interval. This is achieved by short-circuiting the inputs (11, 12) of the protection circuit (10) by means of two diodes ($D_1$, $D_2$) during the flyback intervals.

16 Claims, 4 Drawing Figures

POWER SUPPLY CIRCUIT

BACKGROUND OF THE INVENTION

This invention relates to a power supply circuit for charging a battery comprising, a first series arrangement of a primary winding of a transformer, a first transistor, a first resistor and a second series arrangement of a secondary winding of the transformer and a first rectifier diode. The second series arrangement is provided with connection terminals for connection to the battery. A positive feedback circuit including a first capacitor is connected between the junction of the secondary winding and the first rectifier diode and the base of the first transistor. A second transistor is coupled to the first resistor for turning off the first transistor. A switching amplifier is arranged between the connection terminals of the battery for turning on the second transistor above a first value of the battery voltage and for turning off the second transistor below a second value of the battery voltage that is below the first value. The switching amplifier has a first input, a second input and an output, said first input being coupled to a tap on a voltage divider which is arranged between the connection terminals of the battery by means of a switch during the periods when the first transistor is turned off. The second input is coupled to the connection terminal of the battery facing the first rectifier diode, and said ouput is coupled to the base of the second transistor.

A circuit of this type can be used for charging a battery from different input voltages. The input voltage may be both a rectified alternating voltage and a direct voltage. A circuit of this type is particularly suitable for use in a shaver in which the circuit is used for charging the battery and/or as the power supply of the motor.

A power supply circuit of the type mentioned in the opening paragraph is used in the Philips' shaver which is commercially available under type number HP 1335 at the time of filing this Application. In this circuit a current flows through the primary winding during the so-called forward interval resulting in energy being stored in the transformer. At a given value of the primary current the second transistor is turned on by the voltage across the first resistor and consequently the first transistor is turned off so that the primary current is interrupted. The energy stored is then applied in the form of a charge current to the battery via the secondary winding and the diode during the so-called flyback interval. After the flyback interval the next forward interval is initiated by the positive feedback between the secondary winding and the base of the first transistor. In this manner the battery can be charged relatively rapidly with a comparatively large current.

To avoid damage to the battery due to overcharge, the power supply circuit is provided with a switching amplifier for turning off the power supply circuit above a first value of the battery voltage and subsequently releasing the circuit at the instant when the battery voltage has decreased to below a second value determined by the hysteresis of the switching amplifier. Thus there is a change-over from rapid charge to trickle charge after the first value has been exceeded for the first time.

A circuit of this type is also known from European Patent Application No. 95 072. In these known power supply circuits the switching amplifier is connected to the connection terminals of the battery throughout the flyback interval. During this flyback interval the battery voltage may exceed the first value of the switching amplifier due to the voltage drop caused by the charge current across the internal resistance of the battery, so that the second transistor is turned off. To eliminate the influence of the internal resistance of the battery on the measurement of the battery voltage, the battery voltage determines, only at the end of the flyback interval, i.e. at the instant when the charge current becomes zero, whether the second transistor remains actually turned on and hence whether the next forward interval is blocked.

However, the following problem occurs in these circuits. When the second transistor is turned on during the flyback interval by a battery voltage above the first value of the switching amplifier, this second transistor is to be turned off again if the battery voltage is not above this value at the end of the flyback interval. It takes some time to turn off the second transistor as a result of the presence of capacitive charges. This delays the initiation of the next forward interval, which disturbs the satisfactory operation of the circuit.

SUMMARY OF THE INVENTION

It is therefore an object of the invention to provide a power supply circuit obviating this problem. According to the invention, a power supply circuit of the type mentioned in the opening paragraph is characterized in that the first input of the switching amplifier is coupled by means of a second rectifier diode to the junction of the secondary winding and the first rectifier diode and that the forward direction of the second rectifier diode, reckoned from this junction, is the same as that of the first rectifier diode.

Due to the measure according to the invention two conducting diodes having, however, opposite polarities, are present between the first and the second input of the switching amplifier during a flyback interval so that no voltage is present between these inputs. Consequently the switching amplifier is not activated during a flyback interval. At the end of a flyback interval the secondary voltage and the secondary current become zero. The voltage at the junction of the secondary winding and the first diode subsequently increases again so that the two rectifier diodes are cut off. However, it takes some time before the first transistor is turned on via the positive feedback of the capacitor between the secondary winding and the base of this transistor and the next forward interval is initiated. This time is utilized to measure the battery voltage. At a battery voltage above the first value the second transistor is turned on by the switching amplifier so that the next forward interval is blocked until the battery voltage has decreased to below the second value.

An embodiment of a power supply circuit according to the invention is characterized in that the switch is constituted by a third transistor of a conductivity type which is opposed to that of the first transistor, and whose emitter-collector path is disposed between the battery terminal facing the first transistor and the end of the voltage divider facing this terminal and whose base is coupled by means of a third rectifier diode to the junction of the secondary winding and the first rectifier diode. During a flyback interval the voltage at the junction of the secondary winding and the first diode is negative so that the third transistor is turned on via the third diode and consequently the voltage divider is arranged between the connection terminals of the battery.

This embodiment can be futher characterized in that the base of the third transistor is further coupled by means of a fourth rectifier diode to the connection terminal of the battery facing the first transistor, the fourth rectifier diode being preferably a light-emitting diode. Apparently, this diode lights up during rapid charge and flashes during trickle charge thus informing the user of the fully charged condition of the battery.

To ensure that the voltage divider is not arranged between the connection terminals of the battery during the forward intervals, a further embodiment may be characterized in that the base of the third transistor is also coupled by means of a resistor to the collector of the second transistor. Due to this measure the third transistor is also immediately turned on at the instant when the second transistor is turned on.

A further embodiment is characterized in that the base of the third transistor is connected by means of a second capacitor to a tap, separated with respect to d.c. current from the secondary winding, in the positive feedback between the secondary winding and the base of the first transistor.

Thus it is achieved that if the battery voltage is not above the first value at the end of a flyback interval, the third transistor is rapidly turned off before to the next forward interval is fully initiated.

In a power supply circuit according to the invention, the switching amplifier may be constituted by a Schmitt trigger. A suitable embodiment thereof may be characterized in that the Schmitt trigger comprises a fourth transistor of a conductivity type which is the same as that of the first transistor and whose base is coupled to the first input and the emitter is coupled to the second input and whose collector is connected by means of the parallel arrangement of a second resistor and the base-emitter junction of a fifth resistor of a conductivity type opposed to that of the fourth transistor to the connection terminal of the battery facing the first transistor, th collector of said fifth transistor being coupled by means of a third resistor to the base of the fourth transistor and also to the base of the second transistor.

BRIEF DESCRIPTION OF THE DRAWING

The invention will be further described with reference to the accompanying drawing in which.

DESCRIPTION OF THE PREFERRED EMBODIMENTS

Figure 1:
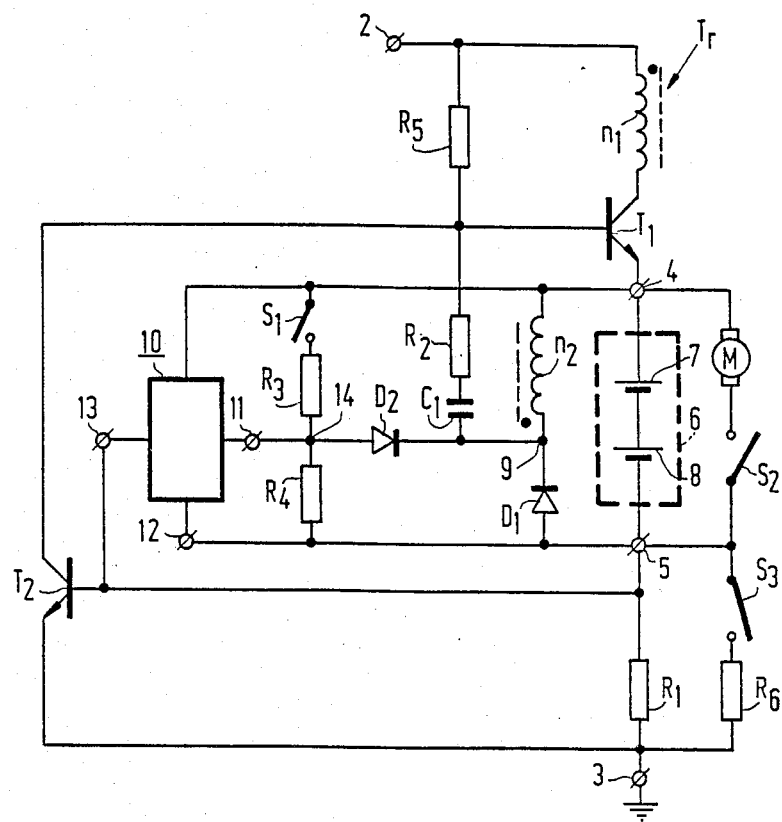
FIG. 1 shows a principle circuit diagram of the power supply circuit according to the invention.

FIG. 1 shows a principle circuit diagram of a power supply circuit according to the invention. The circuit has two input terminals 2 and 3 for applying an input voltage which may be a rectified alternating voltage or a direct voltage. The series arrangement of a primary winding $n_1$ of a transformer $T_r$, the collector-emitter path of a first transistor $T_1$, the series arrangement of a secondary winding $n_2$ and a first rectifier diode $D_1$, with connection terminals 4 and 5 between which a battery 6 is connected, and a first resistor $R_1$ is connected between the terminals 2 and 3. In this example the battery 6 is formed by two series-arranged nickel cadmium accumulator cells 7 and 8. A d.c. motor M of, for example, a shaver may be arranged in parallel with the battery 6 by means of a switch $S_2$. In that case a resistor $R_6$ is connected in parallel with the resistor $R_1$ simultaneously by means of a switch $S_3$. A positive feedback is provided by the series arrangement of a first capacitor $C_1$ and a resistor $R_2$ connected between the junction 9 of the secondary winding $n_2$ and the diode $D_1$ and the base of transistor $T_1$. The base of transistor $T_1$ is also connected via a starting resistor $R_5$ to the input terminal 2. It is to be noted that the circuit may alternatively be started in other ways than with the resistor $R_5$. The resistor $R_1$ is connected to the base of a second transistor $T_2$ whose collector is coupled to the base of the first transistor $T_1$. Furthermore, a switching amplifier 10 having a first input 11, a second input 12 and an output 13 is arranged between the connection terminals 4 and 5 of the battery 6. The first input 11 is connected to a tap 14 of a voltage divider constituted by resistors $R_3$ and $R_4$, resistor $R_3$ being connected by means of a switch $S_1$ to the connection terminal 4 and resistor $R_4$ being connected to the connection terminal 5 of the battery 6. Furthermore the first input 11 is connected by means of a diode $D_2$ to the junction 9 of the secondary winding $n_2$ and diode $D_1$. The forward direction of diode $D_2$, viewed from the junction 9, is the same as that of diode $D_1$. The second input 12 is connected to the connection terminal 5, while the output 13 is connected to the base of the second transistor $T_2$.

The circuit operates as follows. The switches $S_2$ and $S_3$ are initially open and the circuit thus only provides the charge current for the accumulator cells 7 and 8. In the presence of an input voltage across the terminals 2 and 3 a small current flows via the starting resistor $R_5$ in the base of transistor $T_1$ so that it is partly rendered conducting. The resultant current through the primary winding $n_1$ results in an increase of the voltage across the secondary winding $n_2$ so that transistor $T_1$ is turned on further via the positive feedback of capacitor $C_1$ and resistor $R_2$. Due to this positive feedback transistor $T_1$ is then rapidly driven into saturation. The current through the primaray winding $n_1$ subsequently increases linearly with time during the so-called forward interval. At a level of the primary current determined by the resistance of resistor $R_1$ transistor $T_2$ is turned on so that transistor $T_1$ is turned off. Due to the interruption of the primary current the polarity of the voltage across the secondary winding $n_2$ is reversed so that diode $D_1$ is made to conduct. The energy stored in the transformer $T_r$ during the forward interval is then applied in the form of a charge current to the battery 6 during the so-called flyback interval. This current decreases linearly in time to zero. During the flyback interval the voltage at the junction 9 is negative and is equal to the voltage across the diode $D_1$. At the end of the flyback interval the voltage across the winding $n_2$ becomes equal to zero volt so that the voltage at the end 9 becomes equal to the battery voltage. This positive voltage step at the junction 9 ensures the initiation of the next forward interval via the positive feedback of capacitor $C_1$ and resistor $R_2$.

In the manner described above the accumulator cells 7 and 8 can be charged relatively rapidly with a comparatively large current. To prevent damage of the accumulator cells due to overcharge, the power supply circuit is provided with a switching device switching off the power supply circuit when the accumulator cells 7 and 8 are full. Its operation will now be further explained.

The voltage divider made up of resistors $R_3$ and $R_4$ is connected between the connection terminals 4 and 5 of the battery 6 by means of the switch $S_1$ during a flyback interval. A fraction of the battery voltage would then be present across the resistor $R_4$ and it would also be present between the first and the second inputs 11 and 12 of the switching amplifier 10. This is, however, prevented by the second rectifier diode $D_2$.

At the beginning of a flyback interval the voltage across the secondary winding $n_2$ reverses its polarity so that the voltage at the junction 9 becomes negative. Consequently not only diode $D_1$ but also diode $D_2$ becomes conductive. Two conducting diodes having, however, opposite polarities are then present between the inputs 11 and 12 of the switching amplifier 10 so that there is no voltage between these inputs. Thus, no information about the magnitude of the battery voltage is presented to the switching amplifier 10 during a flyback interval. As already stated, a voltage step occurs at the end 9 of the secondary winding $n_2$ at the end of the flyback interval. This step is passed on with a certain delay by the positive feedback of capacitor $C_1$ and resistor $R_2$ to the base of transistor $T_1$ so that it takes some time after the end of a flyback interval before transistor $T_1$ is rendered fully conducting again. Since the switch $S_1$ is also opened with a certain delay, the battery voltage can be measured during this time without the internal resistance of the accumulator cells 7 and 8 influencing the measurement. Due to the voltage step at the junction 9 at the end of a flyback interval diode $D_2$ is in fact cut off so that then the fraction of the battery voltage present across the resistor $R_4$ is present between the inputs 11 and 12 of the switching amplifier 10. If this voltage is higher than a first threshold value, the voltage at the output 13 switches over from a low to a high value. Consequently transistor $T_2$ is turned on and transistor $T_1$ is turned off so that the further initiation of the next forward interval is blocked. The battery voltage must then decrease to below the second threshold value of the switching amplifier 10 before transistor $T_2$ is turned off again and transistor $T_1$ can become conducting again via the starting resistor $R_5$. In this manner there is a changeover from rapid charge to trickle charge.

If the switches $S_2$ and $S_3$ are closed, the motor M is arranged in parallel with the battery 6. The power supply circuit then also supplies the motor current. The value of the primary current at which the transistor $T_1$ is turned off is then determined by the parallel arrangement of the resistors $R_1$ and $R_6$.

Figure 2:
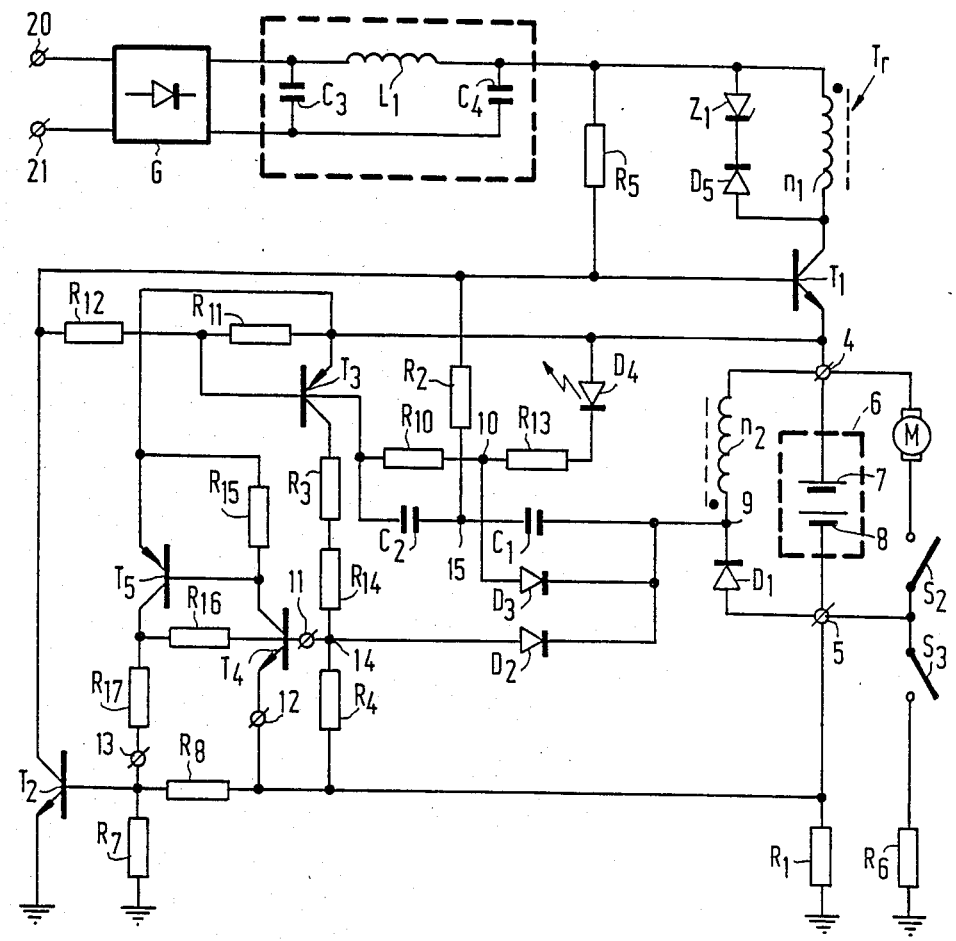
FIG. 2 shows a first embodiment of a power supply circuit according to the invention.

FIG. 2 shows a first embodiment of the power supply circuit according to the invention. The same components are denoted by the same reference numerals as in FIG. 1. In this embodiment the AC supply voltage is applied via two terminals 20 and 21 to a rectifier bridge G. The rectified voltage is smoothed with the aid of a filter 22 constituted by two capacitors $C_3$ and $C_4$ and a coil $L_1$ and is subsequently applied to the primary winding $n_1$ of the transformer. A Zener diode $Z_1$ in series with a diode $D_5$ is arranged in parallel with the winding $n_1$ by means of which diode voltage peaks are suppressed when switching off the current through the primary winding. Furthermore transistor $T_2$ is coupled to resistor $R_1$ by means of a voltage divider consisting of resistors $R_7$ and $R_8$ in this embodiment. The switch $S_1$ is constituted by a PNP transistor $T_3$ whose emitter is connected to the connection terminal 4 of the battery 6 and whose collector is connected to the resistor $R_3$ of the voltage divider. A resistor $R_{11}$ is provided between the emitter and the base of transistor $T_3$. This base is connected by means of the series arrangement of a resistor $R_{10}$ and a third rectifier diode $D_3$ to the junction 9 of the secondary winding $n_2$ and the diode $D_1$ and furthermore by means of a resistor $R_{12}$ to the collector of transistor $T_2$. The junction 10 of resistor $R_{10}$ and diode $D_3$ is connected by means of a series arrangement of a resistor $R_{13}$ and a light-emitting diode $D_4$ to the connection terminal 4 of the battery 6. During a forward interval the voltage at the end 9 is positive relative to the end 4 of the secondary winding $n_2$. Therefore transistor $T_3$ will not be conducting during a forward interval. However, the connection between the base of transistor $T_3$ via resistor $R_{12}$ and the base of transistor $T_1$ certainly prevents transistor $T_3$ from being turned on during a forward interval. In fact, the positive base-emitter voltage of transistor $T_1$ is then present between the base and emitter of transistor $T_3$. At the end of the forward interval transistor $T_2$ is rapidly driven into saturation so that transistor $T_1$ is turned off. Consequently, the voltage at the base of transistor $T_3$ is decreased via resistor $R_{12}$ so that transistor $T_3$ is turned on. By reversal of the polarity of the voltage across the secondary winding $n_2$ the voltage at the end 9 becomes negative so that diode $D_3$ becomes conducting and transistor $T_3$ is maintained turned on. Transistor $T_3$ is then entirely driven into saturation so that the voltage drop across the collector-emitter path of this transistor is negligible. Due to the conduction of diode $D_3$ a current will also start flowing through the light-emitting diode $D_4$. During rapid charge this diode will appear to be continuously on due to the high frequency of the flyback intervals, whereas during trickle charge this diode will flash. The switching amplifier 10 includes an npn transistor $T_4$ whose base constitutes the first input 11 and whose emitter constitutes the second input 12. The collector of this transistor is connected by means of the series arrangement of a resistor $R_{15}$ and the base-emitter junction of a pnp transistor $T_5$ to the connection terminal 4 of the battery. The collector of this transistor $T_5$ is coupled by means of a resistor $R_{16}$ to the base of transistor $T_4$ and is furthermore coupled by means of a resistor $R_{17}$ to the output 13. In this embodiment the voltage divider has a resistor $R_{14}$ with a positive temperature coefficient which, together with the negative temperature coefficient of the base-emitter voltage of transistor $T_4$, ensures that the temperature coefficient of the threshold voltage of the switching amplifier is adapted to the temperature coefficient of the accumulator cells, which is negative. The switching amplifier 10 constitutes a Schmitt trigger whose operation is assumed to be known and will not be further explained. When the voltage across the resistor $R_4$ exceeds the first threshold value at the end of a flyback interval, transistor $T_2$ is turned on via the Schmitt trigger 10 and the power supply circuit is switched off. Transistor $T_3$ is then maintained saturated by means of resistor $R_{12}$. When the battery voltage subsequently decreases to below a second threshold value determined by the resistor $R_{16}$, transistor $T_2$ is turned off again and the power supply circuit can start again. When the voltage across resistor $R_4$ does not exceed the first threshold value of the Schmitt trigger after the end of a flyback interval, the subsequent forward interval is initiated again via the positive feedback of capacitor $C_1$ and resistor $R_2$. Transistor $T_3$ should then be turned off before transistor $T_1$ is turned on. This is realized by a capacitor $C_2$ which is disposed between the base of transistor $T_3$ and the junction 15 of capacitor $C_1$ and resistor $R_2$.

Figure 3:
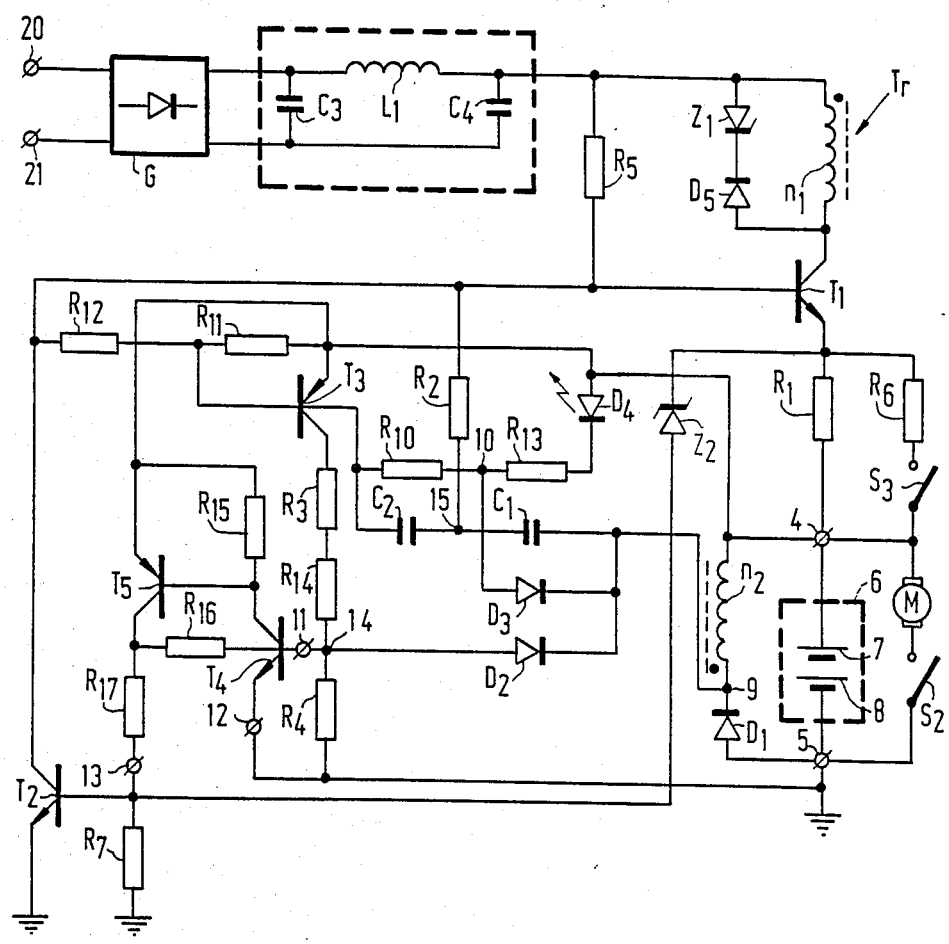
FIG. 3 shows a second embodiment of a power supply circuit according to the invention.

FIG. 3 shows a second embodiment of a power supply circuit according to the invention in which the same components have the same reference numerals as those in FIG. 2. The difference between this embodiment and that of FIG. 2 is that resistor $R_1$ is now disposed between transistor $T_1$ and the connection terminal 4 of the battery 6. The resistor $R_1$ is coupled to the base of transistor $T_2$ by means of a Zener diode $Z_2$. During a forward interval Zener diode $Z_2$ breaks down at a given value of the primary current so that transistor $T_2$ is turned on and consequently transistor $T_1$ is turned off. Otherwise, the operation of the circuit is the same as that of FIG. 2.

Figure 4:
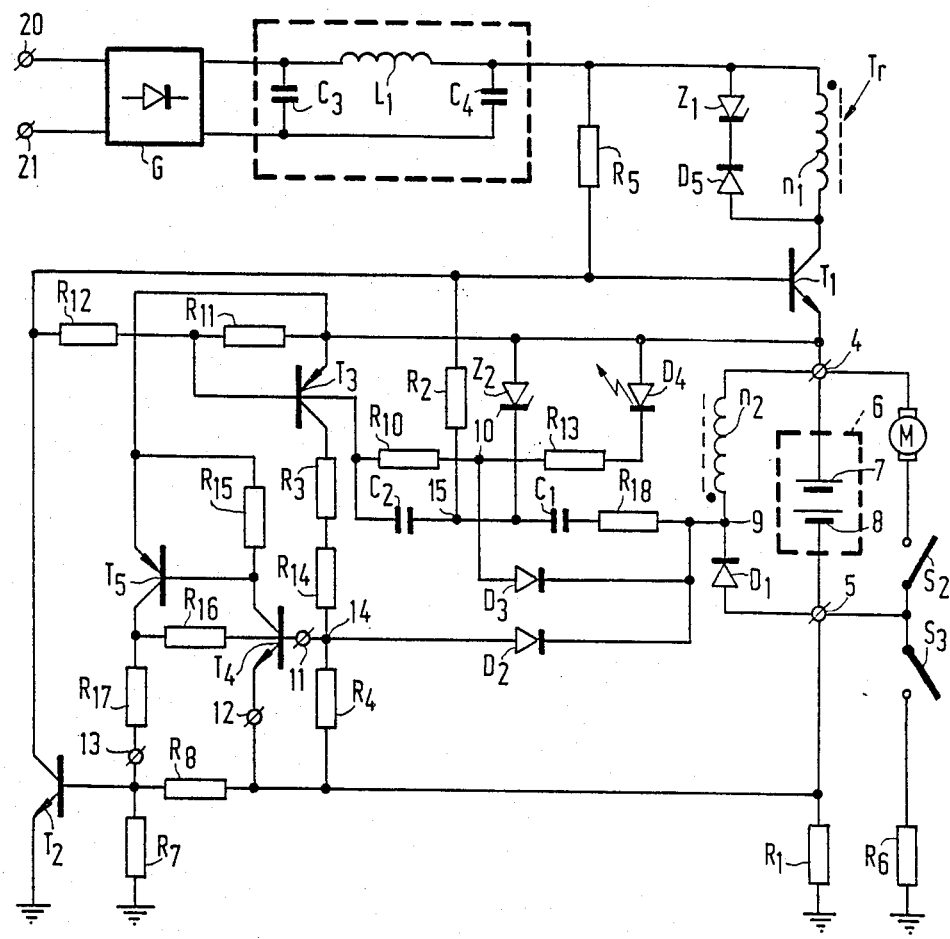
FIG. 4 shows a third embodiment of a power supply circuit according to the invention.

FIG. 4 shows a third embodiment of a power supply circuit according to the invention. The same components are denoted by the same reference numerals as in FIG. 2. The power supply circuits shown in FIGS. 1, 2 and 3 provide a constant mean output current at a given input voltage. This output current is, however, dependent on the input voltage. An increasing input voltage leads to an increasing base current of the first transistor $T_1$ via the positive feedback between the secondary winding $n_2$ and the base of this transistor. Consequently transistor $T_1$ is each time driven further into saturation with increasing input voltages so that an increasing delay occurs upon turning off transistor $T_1$ after the switch-off level of the primary current has been reached. The primary current therefore has an increasing overshoot at increasing input voltages, which results in an increasing mean output current.

However, the output current of the power supply circuit is to remain within a given range in order to prevent damage to the batteries and/or the motor and the electronics of the circuit due to a too large current at high input voltages and in order to be able to supply a sufficient charge current for the batteries and/or the supply current for the motor at low input voltages.

In order that the power supply circuit can be used with the mains voltages present in the various countries without any adaptation or switch-over, a base-current compensation is employed in the circuit of FIG. 4, which realizes that the base-current of transistor $T_1$ does not increase any further above a given input voltage. It is to be noted that this base-current compensation is described in the U.S. patent application Ser. No. 736,630, filed May 20, 1985. In this embodiment the positive feedback is constituted by the series arrangement of a resistor $R_{18}$, capacitor $C_1$ and resistor $R_2$, where the first two elements may be interchanged. Furthermore the connection terminal 4 of the battery 6 is connected by means of a Zener diode $Z_2$ to the junction 15 of resistor $R_2$ and capacitor $C_1$.

During a forward interval the maximum voltage at the end 9 of the secondary winding $n_2$ is determined by the input voltage and the transformation ratio of transformer $T_r$. At comparatively low input voltages the Zener diode $Z_2$ is not yet conducting during a forward interval. The base current of transistor $T_1$ is then determined by the voltage difference between the positive end 9 of winding $n_2$ and the base of transistor $T_1$ and by the resistance of the resistors $R_2$ and $R_{18}$. At an increasing input voltage the voltage at the junction 15 of capacitor $C_1$ and resistor $R_2$ increases due to the increasing base current, so that at a given input voltage the Zener diode $Z_2$ becomes conductive during a forward interval. The base current is then determined by the difference between the Zener voltage and the base-emitter voltage of the transistor $T_1$ and by the resistance of resistor $R_2$. In the case of a further increase of the input voltage a further increase of the base current is removed via the Zener diode $Z_2$ to the emitter of transistor $T_1$. The base current of transistor $T_1$ thus does not increase any further so that transistor $T_1$ is not further driven into saturation at increasing input voltages. This prevents an increasing turn-off delay from occurring at increasing input voltages. The output current of the circuit thus remains within a range in which the accumulator cells 7 and 8 and the electronics of the circuits are not damaged by excessive current.

In addition to the base current compensation shown, the power supply circuit according to the invention may also be provided with a compensation for the frequency increasing at an increasing input voltage and hence an increasing mean output current of the circuit. This increasing frequency is caused because the primary current increases more and more rapidly during a forward interval in the case of an increasing input voltage so that also the level at which the transistor $T_1$ is turned off is reached more and more rapidly. Such compensations are known, for example, from European Patent Specification No. 30 026 and British Patent Application No. 2,138,977.

The invention is not limited to the embodiments shown. For example, the switching amplifier may alternatively be constructed in different ways.

What is claimed is:

1. A power supply circuit for charging a battery comprising: a first series circuit comprising a primary winding of a transformer, a first transistor, a first resistor and a second series circuit comprising a secondary winding of the transformer and a first rectifier diode, said second series circuit having connection terminals for connection to the battery, a positive feedback network including a first capacitor connected between a junction of the secondary winding and the first rectifier diode and a base of the first transistor, a second transistor coupled to the first resistor and the first transistor for turning off the first transistor, a switching amplifier coupled between the connection terminals for the battery for turning on the second transistor above a first value of the battery voltage and for turning off the second transistor below a second value of the battery voltage, the second battery voltage value being less than the first value, said switching amplifier having a first input, a second input and an output, means coupling said first input to a tap on a voltage divider, a switch coupling the voltage divider between the connection terminals for the battery during periods when the first transistor is turned off, means coupling said second input to the connection terminal of the battery facing the first rectifier diode, means coupling said switching amplifier output to a base of the second transistor, and means coupling the first input of the switching amplifier by means of a second rectifier diode to the junction of the secondary winding and the first rectifier diode with the forward direction of the second rectifier diode, as seen from said junction, being the same as that of the first rectifier diode.

2. A power supply circuit as claimed in claim 1, characterized in that the switch comprises a third transistor of a conductivity type opposite to that of the first transistor, and with an emitter-collector path coupled between the battery connection terminal facing the first transistor and an end of the voltage divider, and a third rectifier diode coupling a base of the third transistor to the junction of the secondary winding and the first rectifier diode.

3. A power supply circuit as claimed in claim 2, further comprising a fourth diode coupling the base of the third transistor to the connection terminal of the battery facing the first transistor.

4. A power supply circuit as claimed in claim 3, wherein the fourth rectifier diode comprises a light-emitting diode.

5. A power supply circuit as claimed in claim 4, further comprising means coupling the base of the third transistor to the collector of the second transistor.

6. A power supply circuit as claimed in claim 5, further comprising a second capacitor connecting the base of the third transistor to a tap, separated with respect to d.c. current from the secondary winding, in the positive feedback network.

7. A power supply circuit as claimed in claim 2 wherein the switching amplifier comprises a Schmitt trigger.

8. A power supply circuit as claimed in claim 7, wherein the Schmitt trigger comprises a fourth transistor of the same conductivity type as that of the first transistor and having a base coupled to the first input and an emitter coupled to the second input, a fifth transistor of a conductivity type opposite to that of the fourth transistor, means including a parallel arrangement of a second resistor and a base-emitter junction of the fifth transistor for connecting a collector of the fourth transistor to the connection terminal for the battery facing the first transistor, a third resistor coupling a collector of said fifth transistor to the base of the fourth transistor, and means coupling the collector of the fifth transistor to the base of the second transistor.

9. A power supply circuit as claimed in claim 1 further comprising a second switch for coupling a motor in parallel with the battery, and a third switch for simultaneously connecting a further resistor in parallel with the first resistor.

10. A power supply circuit as claimed in claim 1 having a forward interval and a flyback interval corresponding to the conductive (on) and cut-off periods, respectively, of the first transistor, a forward interval being initiated by positive voltage feedback from the secondary winding to the base of the first transistor via the positive feedback network and the flyback interval being initiated at a given value of primary current flowing in the first resistor at which the second transistor turns on and which in turn cuts off the first transistor, and wherein the switch comprises a third transistor having a control electrode coupled via a third diode to said junction and with the third diode polarized so as to couple the voltage at said junction to said third transistor control electrode during a flyback interval thereby to turn on the third transistor.

11. A power supply circuit as claimed in claim 1 wherein the switch comprises a third transistor having a control electrode coupled via a third diode to said junction and via a second capacitor to a circuit point in the positive feedback network.

12. A power supply circuit as claimed in claim 1 wherein the switch comprises a third transistor having a control electrode coupled via a third diode to said junction and further comprising a resistor coupling said control electrode to the collector of the second transistor.

13. A power supply circuit as claimed in claim 2 further comprising means coupling the base of the third transistor to the collector of the second transistor via a resistor.

14. A power supply circuit as claimed in claim 13 further comprising means connecting the base of the third transistor to a tap point in the positive feedback network via a second capacitor.

15. A power supply circuit as claimed in claim 2 further comprising means connecting the base of the third transistor to a tap point in the positive feedback network via a second capacitor.

16. A shaver comprising: a motor connected via a switching device to a pair of connection terminals for a battery, and a power supply circuit coupled to the connection terminals for charging a battery when connected to the connection terminals, said power supply circuit comprising, a first series circuit including a primary winding of a transformer, a first transistor, said pair of connection terminals and a first resistor, a second series circuit including a secondary winding of the transformer and a first diode coupled to the connection terminals, a positive feedback network including a first capacitor connected between a junction of the secondary winding and the first diode and a base of the first transistor, a second transistor coupled to the first resistor and to the first transistor for turning off the first transistor, a switching amplifier coupled to the connection terminals for turning on the second transistor above a first value of the battery voltage and for turning off the second transistor below a second lower value of the battery voltage, a switch coupling a first input of the switching amplifier to a first of said connection terminals during periods when the first transistor is turned off, means coupling an output of the switching amplifier to a base of the second transistor to turn the second transistor on and off at the first and second values, respectively, of the battery voltage, and a second diode coupling said first input of the switching amplifier to the junction of the secondary winding and the first diode with the first and second diodes polarized in the same direction relative to said junction.

* * * * *

UNITED STATES PATENT AND TRADEMARK OFFICE
CERTIFICATE OF CORRECTION

PATENT NO. : 4,684,871

DATED : August 4, 1987

INVENTOR(S) : Joseph A.M. Plagge

It is certified that error appears in the above-identified patent and that said Letters Patent is hereby corrected as shown below:

IN THE CLAIMS

Claim 5, line 2    delete "means" insert

--a resistor--

Signed and Sealed this

Twenty-fifth Day of October, 1988

Attest:

DONALD J. QUIGG

Attesting Officer         Commissioner of Patents and Trademarks